United States Patent
Nanba et al.

[11] 3,950,765
[45] Apr. 13, 1976

[54] EXPOSURE CONTROL DEVICES FOR PHOTOGRAPHIC CAMERAS

[75] Inventors: Yasuhiro Nanba, Sakai; Kayoshi Tsujimoto, Osaka; Seiji Yamada, Sakai, all of Japan

[73] Assignee: Minolta Camera Kabushiki Kaisha, Japan

[22] Filed: July 9, 1974

[21] Appl. No.: 486,849

[30] Foreign Application Priority Data
July 17, 1973 Japan.............................. 48-81087
July 17, 1973 Japan.............................. 48-81088

[52] U.S. Cl. ...................... 354/29; 354/38; 354/43; 354/50; 354/51; 354/60 R
[51] Int. Cl.² ........................................ G03B 7/08
[58] Field of Search ............ 354/29, 39, 43, 50, 51, 354/60 R, 38

[56] References Cited
UNITED STATES PATENTS
3,554,104  1/1971  Winkler et al. ..................... 354/39
3,638,544  2/1972  Kitai ................................. 354/51
3,829,867  8/1974  Ono .................................. 354/29

Primary Examiner—L. T. Hix
Assistant Examiner—Russell E. Adams, Jr.
Attorney, Agent, or Firm—Watson Cole Grindle & Watson

[57] ABSTRACT

In an exposure control device for a photographic camera a shutter speed control signal generating circuit measures scene light transmitted through an objective lens and a diaphragm for automatically controlling the shutter speed commensurate to the measured light output. A control output signal is generated in response to a manually selectable shutter speed. A diaphragm control device controls the diaphragm aperture according to the difference in the light measuring output and shutter speed output signal. The light measuring and shutter speed output signals are selectively connectable to a shutter speed control device for exposure control. A portion of the automatic shutter speed control signal is added to the manually selected shutter speed control signal so that diaphragm aperture control is effected according to the difference between the combined signal and the automatic shutter speed control signal. Control of the diaphragm and shutter speed as well as programmed exposure control of the shutter speed and diaphragm aperture commensurate with the brightness of an object are effected.

21 Claims, 5 Drawing Figures

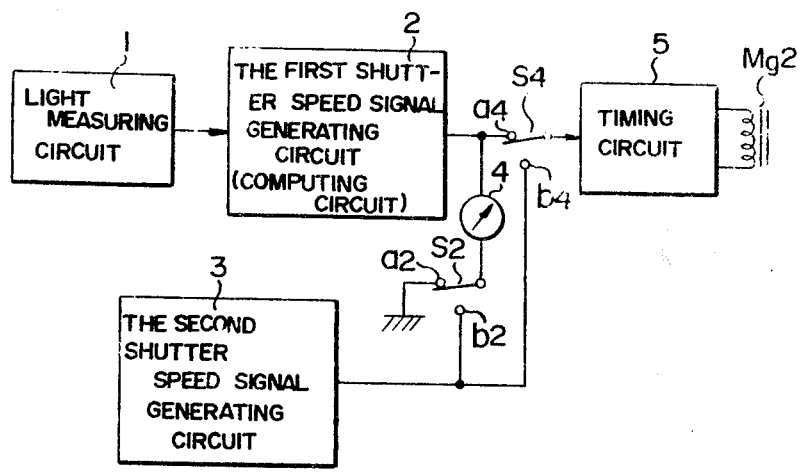
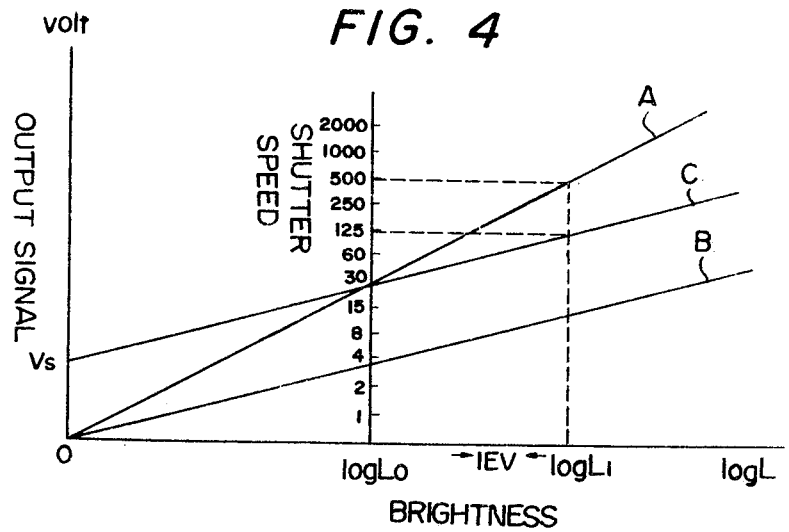

1

EXPOSURE CONTROL DEVICES FOR PHOTOGRAPHIC CAMERAS

BACKGROUND OF THE INVENTION

There are known (i) an exposure control device of the type in which the shutter speed is controlled commensurate with the brightness of an object by prior manual adjustment of the diaphragm; (ii) an exposure control device of the type in which the shutter speed is initially selected and the diaphragm aperture is controlled commensurate with the brightness of an object; and (iii) an exposure control device of the type in which a programmed exposure control is effected for the diaphragm aperture and the shutter speed commensurate with the brightness of an object. However, an exposure control device of the type in which at least two of the above enumerated three types of exposure controls are effected by means of a single exposure control device does not exist.

SUMMARY OF THE INVENTION

According to the present invention, there is provided an exposure control device for a photographic camera wherein a first shutter speed signal generating circuit controls the shutter speed by measuring the scene light which has been transmitted through an objective lens and a diaphragm. A second shutter speed signal generating circuit generates an output signal commensurate with a manually selected shutter speed. A shutter speed control member is connectable to either one of the aforesaid first and second shutter speed signal generating circuits. A detecting member receives signals from the aforesaid first and second shutter speed signal generating circuits and detects the difference in outputs therefrom. A diaphragm control member controls the diaphragm which is adjustable manually and the diaphragm aperture of which may be controlled by the aforesaid detecting member.

The first feature of the present invention is that, when controlling exposure by controlling the diaphragm, with prior selection of the shutter speed, a second signal generating circuit is connected to the shutter speed control member, and signal outputs from first and second signal generating circuits are input to a detecting member for controlling the diaphragm aperture, whereby the shutter speed is controlled by the output signal from the second signal generating circuit.

A second feature of the present invention is that the diaphragm aperture is set by diaphragm adjusting means, whereby the shutter speed is controlled by means of the second signal generating circuit.

A third feature of the present invention is that an output signal from the first signal generating circuit is divided to a desired ratio by a switching member and a converting circuit, which adds the signal output thus divided to the signal output corresponding to a selected shutter speed, in the second signal generating circuit. A programmed exposure control is effected for the diaphragm aperture to be controlled by the detecting member commensurate with the brightness of an object by connecting the second signal generating circuit to the shutter speed control member. The shutter speed is also controlled by an output signal from the second signal generating circuit, thereby providing mutual programmed control of the diaphragm aperture and the shutter speed.

OBJECTS OF THE INVENTION

It is an object of the present invention to provide an exposure control device for a photographic camera which selectively permits exposure control commensurate with the brightness of an object by manually adjusting the diaphragm and permits exposure control commensurate with the brightness of an object by prior selection of the shutter speed.

It is another object of the present invention to provide an exposure control device for a photographic camera which selectively permits programmed exposure control for the shutter speed and diaphragm aperture commensurate with the brightness of an object in addition to the above mentioned exposure control types (i) and (ii).

These and other objects and features of the present invention will be apparent from the following specification taken together with the accompanying drawings wherein:

BRIEF DESCRIPTION OF THE DRAWINGS

FIG. 1 is a block diagram illustrating the principle of the present invention;

FIG. 4 is a graph illustrating mutual programmed exposure control of the diaphragm aperture and the shutter speed as provided in the above two embodiments.

DETAILED DESCRIPTION OF THE PREFERRED EMBODIMENTS

Figure 2:
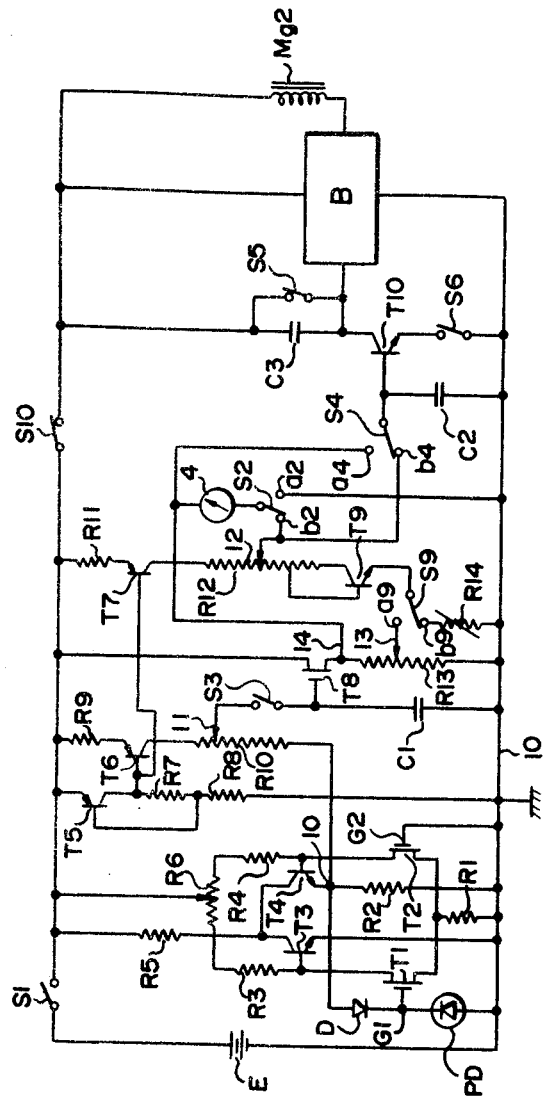
FIG. 2 is an electric circuit of one embodiment of the present invention.

Referring now to FIG. 1, light measuring circuit 1 receives the scene light which has been transmitted through an objective lens and a diaphragm (which may be either fully open or stopped-down) and includes a known photoelectric converting element which produces current commensurate with the quantity of light received. A light measuring output therefrom is input to computing circuit 2. Computing circuit 2 converts the light measuring output to a logarithmically compressed voltage. In this respect, when controlling exposure with a fully open diaphragm, the film sensitivity and prior adjusted diaphragm aperture setting are photographically computed or added to the aforesaid voltage. However, in the case of exposure control with stopped-down light measuring, computing circuit 2 includes a storage means which integrates the film sensitivity alone and produces a first shutter speed control signal which is stored. The voltage stored by the storage means is input to detecting member 4 and the storage means is also connected to terminal $a4$ of switch S4.

Second signal generating circuit 3 produces a signal output commensurate with the selected shutter speed in accordance with a known shutter speed selecting member such as a shutter dial, and is connected to terminal $b4$ of switch S4 and to terminal $b2$ of switch S2. The other terminal of detecting member 4 is connected to the movable contact of switch S2, and terminal $a2$ of switch S2 is grounded.

Timing circuit 5 is connected to the movable contact of switch S4 and produces a current, which is the anti-logarithmic conversion of the voltage input thereto, and energizes electromagnet Mg2.

Accordingly, when controlling exposure, with prior selected diaphragm aperture and shutter speed, switch S2 is closed on contact a2 and switch S4 is closed on contact b4. Moreover, when controlling exposure by automatically controlling the shutter speed, switch S2 is closed on contact a2 and switch S4 is closed on contact a4. Further, when controlling exposure with prior selection of the shutter speed, switch S2 is closed on contact b2 and switch S4 is closed on contact b4. Computing circuit 2 is set so as not to receive the diaphragm aperture setting, and then the diaphragm is first set to the fully open condition along with the releasing operation of the camera, after which the diaphragm is gradually stopped-down from its fully open conditions, prior to the commencement of exposure. In this case, light measurement with the diaphragm fully open is first carried out, so that an output signal from computing circuit 2, i.e., an output from the first signal generating circuit, controls the shutter speed.

The output from circuit 2 will be given according to the expression (determined in accordance with the Additive System of Photographic Exposure (APEX) as explained in the Standard entitled "General-Purpose Photographic Exposure Meters (Photoelectric Type)"; approved May 11, 1961 by the American Standards Association, Inc.):

$$T_{vo} = B_v + S_v - A_{vo} \qquad (1)$$

wherein $T_{vo}$ represents an optimum shutter speed in light measuring with a fully open diaphragm, $A_{vo}$ is the diaphragm aperture in light measuring with a fully open diaphragm, $B_v$ is the brightness of an object and $S_v$ is the film speed.

Also, the output signal from the second signal generating circuit is expressed in a similar manner, as follows:

$$T_v = B_v + S_v - A_v \qquad (2)$$

wherein $T_v$ represents a selected shutter speed, and $A_v$ is the optimum diaphragm aperture in accordance with the aforesaid shutter speed.

Detecting member 4 detects the difference in output signals from both signal generating circuits 2, 3, such that the output of detecting member 4 is the difference between equations (1) and (2), or:

$$T_{vo} - T_v = A_v - A_{vo} \qquad (3)$$

The detected output according to the left side of the above equation is balanced by the diaphragm apertures on the right side thereof, so that the diaphragm is stopped-down to an extent corresponding to the aforesaid balance from its fully open condition.

Due to the ensuing releasing operation, timing circuit 5 operates the shutter according to a pre-selected shutter speed by the output signal from second signal generating circuit 3.

Referring to FIG. 2, S1 is a power source switch adapted to be immediately closed along with the releasing operation. A differential amplifier circuit consisting of field effect transistors (FET) T1, T2 and transistors T3, T4 and resistors R1 to R6 has input terminals which are gates G1, G2 of FET T1 and T2 and output terminal 10 which is connected to the emitter of transistor T4. Connected between one input terminal G1 and ground 10a is photodiode PD which receives the scene light transmitted through an objective lens and a diaphragm. Input terminal G2 is grounded. Output terminal 10 provides negative feedback via diode D for logarithmic conversion to input terminal G1.

According to the operation of the differential amplifier, a voltage across photo-diode PD is almost zero, while a photoelectric current having a high proportional accuracy for the incident light and excluding dark current flows through photo-diode PD. Since the photoelectric current flows through diode D, a voltage across diode D is proportional to the logarithmic value of the photoelectric current and is the output voltage of the differential amplifier.

A circuit consisting of transistors T5 to T7, resistors R7 to R9 and R11 generates a current, which varies in accordance with the absolute temperature, to the collectors of transistors T6 and T7, compensating for the temperature characteristic of diode D. The connection of the base of transistor T5 to the junction of resistors R7 and R8 compensates for power source voltage variations. Potentiometer R10 provides a voltage signal representing the diaphragm aperture and the film sensitivity. Potentiometer R10 has a linear characteristic and the position of sliding terminal 11 establishes the film sensitivity and the preset diaphragm aperture value. The voltage appearing at sliding terminal 11 (with respect to ground) is the sum of the voltage at output terminal 10 of the aforesaid differential amplifier and the voltage generated by the aforementioned temperature compensating circuit. Thus, potentiometer R10 having its lower end connected to output terminal 10 constitutes computing circuit 2 which photographically computes or sums the object brightness, film sensitivity and the adjusted diaphragm aperture.

Sliding terminal 11 is set to a position dependent on the film sensitivity and the preset diaphragm aperture value for light measuring with a fully open diaphragm. However, in the case of exposure with the pre-selected shutter, sliding terminal 11 is set to a position which depends only on the film sensitivity.

Capacitor C1 charges and stores the output (voltage at sliding terminal 11) from computing circuit 2 in a manner that switch S3 is opened prior to the commencement of movement of a mirror from its viewing position to its picture taking position and such that the exposure time immediately before movement of the movable mirror is stored as is well known. FET T8 operates from the voltage of capacitor C1 as an impedance converting circuit in a source follower mode.

A timing circuit consists of transistor T10, capacitors C2, C3, switches S5, S6 and switching circuit B. Transistor T10 anti-logarithmically converts the voltage of capacitor C1. Thus, when switch S5 is opened prior to commencement of exposure and trigger switch S6 is closed simultaneously with commencement of exposure, capacitor C3 integrates the collector current of transistor T10. Then, when the charging voltage reaches a certain level, switching circuit B is triggered to interrupt the excitation of electromagnet Mg2, thereby completing exposure.

The generated sources of voltages to be impressed on the base of transistor T10 vary depending on the mode of exposure control, that is, either where the diaphragm is adjusted, or where the shutter speed is selected. The aforesaid sources are selected by switch S4. As shown in FIG. 2, if switch S4 is closed on contact a4, then there will be provided a conventional exposure time control circuit, with prior adjustment of the diaphragm, as has been described with reference to FIG. 1.

Potentiometer R12 connected to the collector of transistor T7 has sliding terminal 12 which moves in cooperation with the manual shutter time selecting operation and produces a voltage corresponding to the voltage signal appearing at terminal 14 of FET T8. Transistor T9 compensates for the temperature characteristics of transistor T10. Variable resistor R13 adjusts the output level at sliding terminal 13. Switch S10 is closed in cooperation with the shutter releasing operation and is normally open.

For exposure control with a pre-selected shutter speed, switches S2, S4 and S9 are closed on contacts b2, b4 and b9, respectively. At this time, the shutter speed is that speed set manually, because the voltage at sliding terminal 12 is impressed on the base of transistor T10. However, the upper terminal of detecting member 4 is connected to output terminal 14 of computing circuit 2, which has the shutter speed control information with the light measurement taken with the diaphragm fully open. Also, the lower terminal of detecting member 4 is switched from ground 10 to sliding terminal 13, so that the indication of voltmeter 4 is the difference between the shutter speed, with the light measurement taken with the diaphragm fully open, and the manually selected shutter speed, whereby a member for detecting the position of voltmeter 4 causes the diaphragm to be stopped-down in accordance with well-known mechanism.

Since switches S2 and S4 are closed on contacts b2 and b4, respectively, the shutter speed is controlled by the voltage at sliding terminal 12, i.e., the output signal from second signal generating circuit 2 selected manually. Switch S9 switches between exposure control having a pre-selected shutter speed and the exposure control for the diaphragm aperture and the shutter speed in their mutually programmed relationship. Closing of switch S9 on contact a9 connects the aforesaid programming control circuit. More particularly, when sliding terminal 13 of potentiometer R13 is set to a suitable position and sliding terminal 12 is set to a suitable position corresponding to the position of sliding terminal 13, the voltage characteristic C in FIG. 4 appears at levels commensurate with the brightness of an object. The abscissa of the graph in FIG. 4 represents film sensitivity and the brightness of an object when an open diaphragm aperture is maintained constant, while the ordinate thereof represents the input voltage to transistor T10 and the shutter speed obtained at the above input voltage. Characteristic A in the graph of FIG. 4 represents the voltage at the output terminal of FET T8, and characteristic B represents the voltage at sliding terminal 13. The voltage at sliding terminal 13 is divided from the voltage at terminal 14, with the voltage gradient dependent on the position of sliding terminal 13. Characteristic B is parallel with characteristic C, and thus if characteristic B is moved upwardly vertically, it coincides with characteristic C. Voltage VS corresponding to the vertical spacing of the two characteristics is generated in a circuit incorporating potentiometer R12 and transistor T9. The circuit consisting of transistors T7 and T9, potentiometer R12 effects the level shifting in this case. However, current flowing through potentiometer R12 is set to be lower than current flowing through potentiometer R13. The amount characteristic C is to be shifted and the gradient thereof are varied by sliding terminals 12 and 13. FIG. 4 shows characteristic C intersecting with characteristic A at the shutter speed of 1/30 second in the low speed region of the shutter, which would not cause a hand blur for hand-photography. In this manner, programmed exposure control may be effected for brightness exceeding the brightness Lo corresponding to the shutter speed of 1/30 second with light measuring using a fully open diaphragm. For instance, when the brightness is L1 in FIG. 4, a voltage is produced at terminal 14 so as to provide a shutter speed of 1/500 second for light measuring with a fully open diaphragm, a voltage appears at sliding terminal 12, providing a shutter speed of 1/125 second. The difference in voltage (corresponding to two steps of diaphragm aperture values) is detected by voltmeter 4, and thus the diaphragm is closed by two steps of diaphragm aperture values from its fully open position. As is clear from the foregoing, in case the voltage at sliding terminal 12 is used as a voltage signal for controlling the shutter time, the number of steps of diaphragm aperture values required for the diaphragm to be adjusted is detected by voltmeter 4, whereby an optimum diaphragm setting may be automatically controlled in cooperation with the shutter releasing operation by means of a known mechanism for detecting the position of a meter pointer. The shutter speed to be controlled in this case is given by characteristic C commensurate with the brightness of scene light, and the extent of the diaphragm aperture to be adjusted is given by the difference on the ordinate between the characteristics A and C. At the shutter speed of 1/30 second, the diaphragm is maintained opened. Since the light measuring device measures the scene light which has been transmitted through the objective lens and the diaphragm, it is apparent that an exchangeable lens having different open diaphragm apertures may be used.

Figure 3:
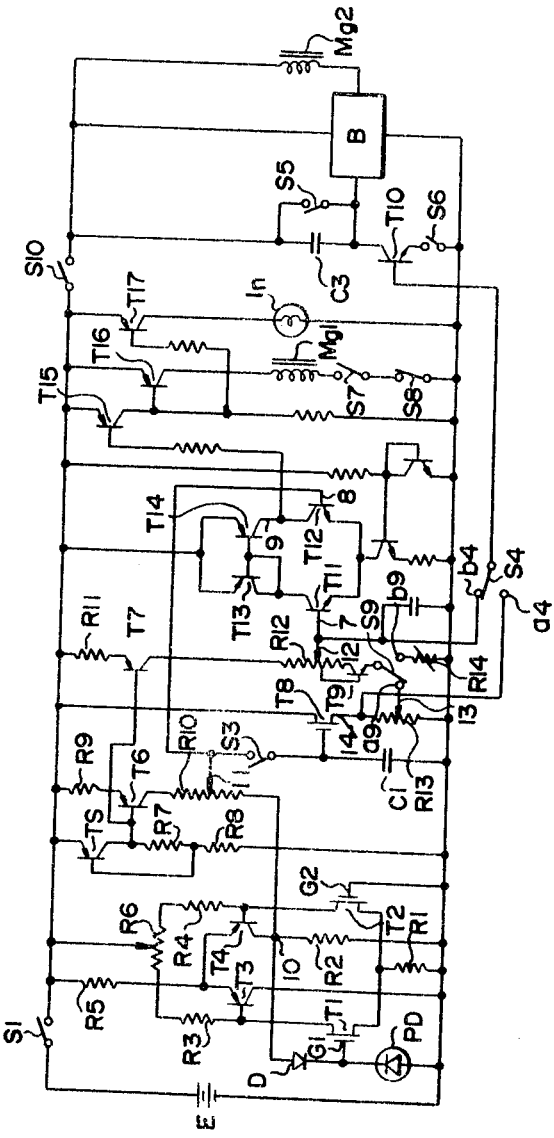
FIG. 3 is an electric circuit of another embodiment of the present invention.

FIG. 3 shows a circuit of the second embodiment of the present invention, similar, except for the detecting member, to that shown in FIG. 2. Specifically, the former embodiment uses a mechanical detecting member to detect the deflected position of the pointer of voltmeter 4, whereas the latter embodiment uses a transistor differential amplifier. As a result, even in the case of exposure control with a prior pre-selected shutter speed, the light measuring circuit operates with light measurement taken with the diaphragm stopped-down following light measurement with the diaphragm fully open in the initial stage of the measurement process. Like components are designated with like reference numerals in common with the first embodiment.

A differential amplifier in the second embodiment consists of transistors T11, T12, T13, T14, and the bases of transistors T11 and T12 are the input terminals of the amplifier, and the collector of transistor T14 is the output terminal 9 thereof. Switch S9 is closed on contact b9, and input terminal 7 is connected to sliding terminal 12 of potentiometer R12, so that the voltage across variable resistor R14 and the resistance of potentiometer R12 between the collector of transistor T9 and sliding terminal 12 appear at sliding terminal 12. The other input terminal 8 is connected to sliding terminal 11 of potentiometer R10.

Output terminal 9 is connected to the base of transistor T15, and the collector thereof is connected as an input to the base of transistor T16. Transistors T15 and T16 constitute a switching circuit. Connected in the collector circuit of transistor T16 in series relation to switches S7 and S8 is diaphragm controlling electromagnet Mg1. Switch S7 is opened or closed in association with the camera releasing operation, and is normally opened and closed immediately after the closing of power source switch S1 after the releasing operation. Switch S8 is normally closed, and is opened upon energization of electromagnet Mg1 and maintained open, until completion of exposure. The actuation of electromagnet Mg1 is indicated by indicating member I$n$ which is operated by transistors T15 and T17.

Accordingly, for exposure control with prior preselected shutter speed, switch S4 is manually closed on contact $b4$, and the shutter speed control mechanism is operated by the output from output terminal 12 of the second signal generating circuit. The diaphragm is maintained open during the initial stage of the release operation, then switches S1 and S7 are closed, TTL light measuring is effected, then switch S3 is opened prior to the closing operation of the diaphragm, and the shutter speed control signal output is charged by capacitor C1 with light measurement taken with the diaphragm fully open.

In general, the voltage generated by the first signal generating circuit, which voltage appears at sliding terminal 11 (light measurement with a fully open diaphragm) is higher than the voltage generated by the second signal generating circuit, which voltage appears at sliding terminal 12, so that electromagnet Mg1 is initially excited.

Subsequently, closing of the diaphragm is effected from the fully open condition, and then the output signal from sliding terminal 11, taken with light measurement under the stopped-down diaphragm condition, is provided to input terminal 8. In this respect, the above output signal decreases as the diaphragm is being stopped down, and when the output signal coincides with the output signal from input terminal 7, then the operating condition of transistors T15 and T16 is reversed according to the output from the differential amplifier, thereby interrupting the excitation of electromagnet Mg1, while the diaphragm is locked by the diaphragm control member to control the diaphragm aperture After completion of diaphragm control as has been described, the exposure is commenced, whereupon trigger switch S6 is closed and the timing circuit is operated by the output signal from the second signal generating circuit to thereby control the shutter speed.

In contrast with the above-described operation, for exposure control with the diaphragm aperture opened, switch S4 is closed on contact $a4$, and the signal commensurate with the diaphragm aperture to be adjusted is produced at sliding terminal 18 of the computing circuit for light measurement taken with the diaphragm fully open. In this case, as well, switch S9 is closed on contact $b9$. Furthermore, the output signal at sliding terminal 12 is set to be zero or almost zero by aligning the shutter speed dial with the automatic scale index. Accordingly, the differential amplifier is not operated, and electromagnet Mg1 maintains its excited condition.

Upon initiation of the releasing operation, switch S3 is opened, and the output signal from the first signal generating circuit (light measurement with the diaphragm fully open) is stored by capacitor C1; the adjusted diaphragm aperture signal is added to the output signal from the first signal generating circuit. Then, after the diaphragm has been set to the adjusted diaphragm aperture setting from the diaphragm fully open condition, the timing circuit is operated by means of the stored capacitor voltage, thereby obtaining an optimum exposure.

However, for exposure control effected commensurate with the brightness of an object with the diaphragm aperture and the shutter speed programmed, switch S9 is closed on contact $a9$ and switch S4 is closed on contact $b4$. The potential at terminal 14 is divided commensurate with the position of sliding terminal 13 of potentiometer R13 connected to terminal 14, so that the divided potential is impressed on the lower terminal of potentiometer R12 through switch S9. An output signal from the first signal generating circuit, generated by light measurement with a fully open diaphragm, is produced at terminal 14, so that the sum of the output signal commensurate with the selected shutter speed and the divided output signal from the first signal generating circuit is produced at sliding terminal 12, whereby the resulting signal output voltage operates the timing circuit as an output signal from the second signal generating circuit. Simultaneously therewith, this output signal is provided to input terminal 7 of the differential amplifier, while an output signal from the first signal generating circuit, generated according to light measurement with a stopped-down diaphragm, is provided to the other input terminal 8, so that the differential amplifier causes the closing operation of the diaphragm to an extent corresponding to the difference between the two signals. In other words, when both input signals become equal, then the differential amplifier will interrupt the excitation of electromagnet Mg1 and lock the diaphragm so as to stop its stopping-down operation.

Referring to FIG. 4, assume that characteristic A represents the relationship between the shutter speed for light measurement with a fully open diaphragm and the brightness of an object. A voltage on characteristic A represents that voltage which is stored by capacitor C1. Characteristic B represents the voltage at sliding terminal 13 of potentiometer R13, which voltage is a division of the aforesaid stored voltage. Characteristic C represents the sum of the voltage of characteristic B and the voltage produced at sliding terminal 12 of potentiometer R12. Characteristic C extends parallel with characteristic B. The gradient of characteristic C and the value on the ordinate for the brightness of an object are varied depending on the positions of sliding terminals 12 and 13 on potentiometers R12 and R13 respectively.

Points on characteristics A and C for one point on the abscissa represent shutter speeds relative to the brightness of an object. Thus, it is possible to select a shutter speed of 1/30 second for the brightness Lo of an object at an intersection of characteristics A and C. Assume that a shutter speed on characteristic A is 1/500 second, as shown, for the brightness L1 of an object on characteristic C, the shutter speed of 1/125 second indicates that the diaphragm is set for overexposure by two steps of the diaphragm aperture value for light measurement with a fully open diaphragm, and thus the diaphragm aperture value should be decreased by two steps. Indicating member I$n$ (FIG. 3) indicates this difference, while the output produced at output terminal 9 of the differential amplifier causes the diaphragm to be locked so as not to be closed by electromagnet Mg1, when the diaphragm is stopped-down from its fully open position to an extent corresponding to the difference between characteristics A and C on the ordinate.

Thus, the exposure is controlled according to the diaphragm aperture to be controlled and to the shutter speed adjusted to 1/125 second. For other object brightness, the diaphragm aperture and shutter speed are varied in a programmed relationship for exposure control. Thus, the diaphragm is stopped-down to a maximum extent from the diaphragm aperture set for the brightness of an object for light measurement with a fully open diaphragm at the shutter speed of 1/30 second. Exposure control is effected for the brightness of an object in the range up to the maximum shutter speed but according to the programmed relationship of the shutter speed and the diaphragm aperture.

Figure 5:
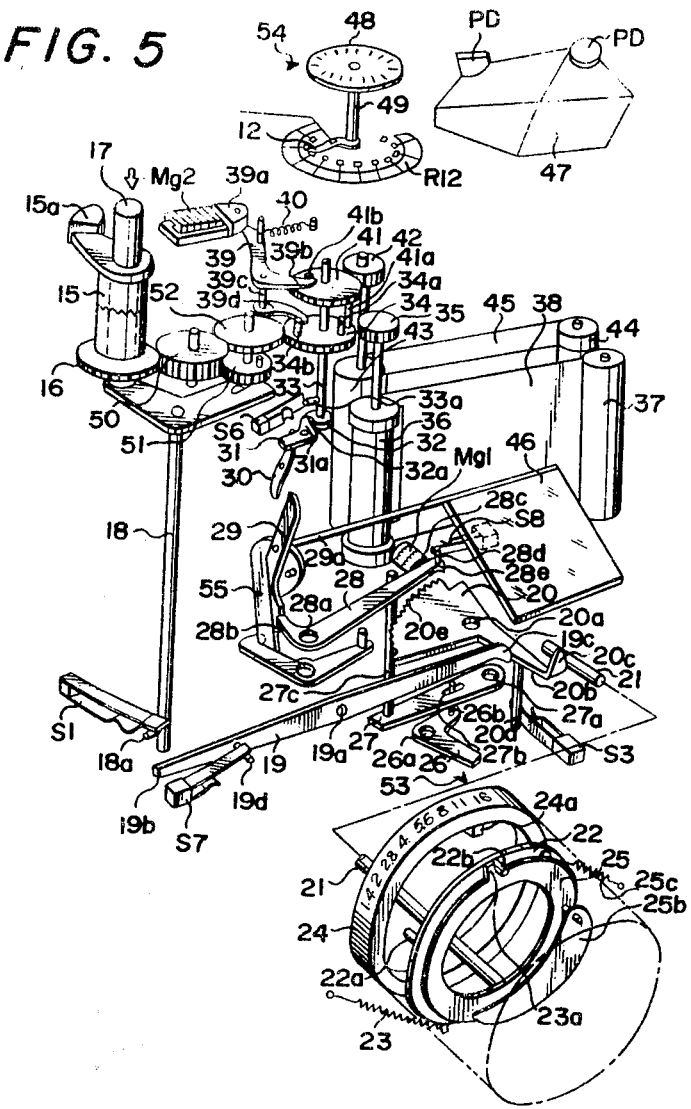
FIG. 5 is a perspective view of one example of a camera mechanism associated with the present invention.

With reference to FIG. 5, release button 17 is movable in the vertical direction and extends through winding shaft 15 which rigidly mounts winding lever 15a and take-up gear 16 thereon. Release button 17 is biased to ascend and descends to initiate the releasing operation.

Projecting from shaft 18 which moves up or down in association with release button 17 is pin 18a which opens power source switch S1 in its upper position and closes the same upon descending. Release rod 19 has one end 19b engaging the lower end of shaft 18, as shaft 18 descends. Release rod 19 is rotatably journaled on shaft 19a and has a tendency to rotate clockwise and has engaging ratchet 19c engageable with arm 20b of sector shaped lever 20. Projecting from rod 19 is pin 19d which normally opens switch S7 and closes the same when it rotates counterclockwise.

Sector shaped lever 20 is rotatable in shaft hole 20a and has a tendency to rotate clockwise. Lever 20 is formed with angled projection 20c and has operating pin 20d projecting therefrom, in addition to ratchet teeth 20e. Shaft hole 20a is at the center of arcuate ratchet teeth 20e. Connecting pin 21 engaging angled projection 20c is anchored in interlocking ring 22 which has a tendency to rotate clockwise by spring 23 within a lens mount (illustrated by the broken outline). Diaphragm preset ring 24 manually adjusts the diaphragm by alignment with index 53 on the camera body. Ring 24 is formed with projection 24a and engageable with pin 22a anchored in interlocking ring 22. Diaphragm operating ring 23 includes rotatably mounted diaphragm blades, although only one of the blades is shown in the drawing. Ring 23 has a tendency to rotate clockwise by spring 25c, with projection 23a in engagement with pin 22b on interlocking ring 22. Diaphragm operating ring 23 changes the diaphragm aperture due to its rotation which follows the rotation of interlocking ring 22.

Operating pin 20d, mounted on sector shaped lever 20 in projecting relation, closes switch S3, when sector shaped lever 20 is locked by release rod 19, while operating pin 20d opens switch S3 simultaneously with commencement of rotation of sector shaped lever 20 as it is released from its locked condition. After sector shaped lever 20 has rotated through an angle including ratchet teeth 20e, operating pin 20d engages lever 26 which is rotatably journaled in shaft hole 26a and has a weak tendency to rotate counterclockwise, thereby rotating lever 26 clockwise. Pin 26b anchored in, but projecting from, lever 26 is rotatably journaled in shaft hole 27a and fitted into slot 27b formed in lever 27, to which pin 27c is affixed in projecting relation.

Diaphragm locking lever 28 is rotatably journaled in shaft hole 28a and has a tendency to rotate clockwise. Lever 28 is formed with engaging piece 28b at the end of an arm thereof, and the other arm end includes (i) armature 28c to be attracted to electromagnet Mg1, (ii) pin 28d to close switch S8 with armature 28c attracted by electromagnet Mg1 and to open switch S8 when pin 28d rotates clockwise, and (iii) locking ratchet 28e adapted to engage ratchet teeth 20e due to the clockwise rotation thereof.

Mirror lever 29 engageable with projection 28b has a tendency to rotate counterclockwise, and mirror 46 is rigidly mounted on shaft 29a. When mirror lever 29 is locked by projection 28b, mirror 46 is in the viewing position, so that the scene light which has been transmitted through the objective lens and diaphragm 25b is reflected by mirror 46 in a direction at a right angle to the optical axis of the objective lens and then directed toward a focussing glass (not shown). Thus, a focussing image may be viewed through pentaprism 47, on which is provided photo-diode PD. Mirror returning lever 55 returns mirror 46 from its picture-taking position to its viewing position in association with the completion of exposure.

Due to its counterclockwise rotation, mirror lever 29 engages forward curtain locking lever 31 having forward curtain locking ratchet 31a, through intermediate lever 30, thereby rotating lever 31 counterclockwise. Forward curtain shaft 33 rigidly mounts thereon cam plate 32 having notch 32a engageable with forward curtain locking ratchet 31a. Shaft 33 mounts forward curtain gear 34 thereon rigidly and pin 33a projecting therefrom to actuate trigger switch S6. Thus, when cam plate 32 is locked by notch 32a engaging forward curtain locking ratchet 31a, trigger switch S6 is opened, and when forward curtain shaft 33 is rotated clockwise, trigger switch S6 is closed.

Forward curtain 38 extends between forward curtain winding shaft 36 and forward curtain take-up shaft 37 having a strong tendency to rotate clockwise. Forward curtain winding shaft 36 rotates integrally but coaxially with gear 35 meshing with forward curtain gear 34. Two pins 34a and 34b are anchored in, but project from, forward curtain 34.

Pin 41a and pin 41b are anchored in, but project from, a rear curtain gear 41 which is rotatably and loosely fitted on forward curtain shaft 33. Pin 41a is engageable with pin 34a. Thus, with winding operation, forward curtain 38 is cocked from its rest position, both pins 34a and 41a engage with each other, whereby rear curtain gear 41 is rotated clockwise to rotate rear curtain 45 from its rest position to its cocked position.

Hooked portion 39b of locking lever 39 is engageable with pin 41b on rear curtain gear 41, when rear curtain 45 is cocked. Lever 39 is rotatable about shaft 39c and has a tendency to rotate clockwise by spring 40 and is formed with armature 39a on its other arm end. Armature 39a is adapted to be attracted to electromagnet Mg2. Lever 39d is integrally but coaxially mounted on shaft 39c to engage pin 34b on forward curtain gear 34, when forward curtain 38 is cocked, whereby lever 39d is rotated counterclockwise. whereupon rear curtain locking lever 39 is rotated in the same direction against the action of spring 40 so that armature 39a is urged against electromagnet Mg2.

When winding shaft 15 is rotated counterclockwise by winding lever 15a, winding gear 16 rotates forward curtain gear 34 clockwise and gear 34 meshes through gears 50, 51 and 52 with gear 16.

Shutter speed dial 48 selects the shutter speed by being manually rotated with its graduation aligned with index 54. Sliding terminal 12 is rigidly mounted on shaft 49 and slides on potentiometer resistance R12.

With the aforesaid arrangement, wherein exposure control is effected by automatically controlling the shutter speed, with the diaphragm pre-adjusted, switch S9 is closed on contact b9 and switch S4 is closed on contact a4, respectively. Diaphragm preset ring 24 is manually aligned with the desired diaphragm aperture graduation, while shutter speed dial 48 is set to the automatic mode position. In this mode, sliding terminal 12 is disconnected from potentiometer resistance R12, while the output signal of zero potential is provided to input terminal 7 of the differential amplifier.

When release button 17 is depressed, with the shutter cocked due to the winding operation as shown in FIG. 5, power source switch S1 is first closed, whereupon an output signal from the first signal generating circuit is provided to input terminal 8 of the differential amplifier. The output signal from the first signal generating circuit is the sum of the light measuring output, generated with the diaphragm fully open, plus the signal representing the pre-adjusted diaphragm aperture and film speed which have been computed in computing circuit 2. Since shaft 18 rotates release rod 19 counter-clockwise to close switch S7, electromagnet Mg1 is excited, because the input voltage at the input terminal of the differential amplifier is zero, thereby attracting diaphragm locking lever 28 to the position shown in FIG. 5. Simultaneously therewith, locking ratchet 19c releases sector shaped lever 20 from being locked, so that sector shaped lever 20 rotates clockwise to thereby open switch S3, and the output signal from the first signal generating circuit is stored by capacitor C1. Following the rotation of sector shaped lever 20, connecting pin 21 moves to the left, as viewed in FIG. 5, while diaphragm operating ring 25 follows the rotation of ring 22 and rotates clockwise to thereby stopdown diaphragm blades 25b from their fully open position. When pin 22a on interlocking ring 22 engages projection 24a, with the diaphragm preset ring 24 adjusted, then its rotation is stopped, thereby adjusting the diaphragm aperture to a pre-adjusted diaphragm aperture.

However, sector shaped lever 20 continues to rotate and operating pin 20d engages lever 26 to thereby rotate it clockwise, while pin 27c on lever 27, which is rotated counterclockwise in association therewith, rotates diaphragm locking lever 28 against the attracting force of electromagnet Mg1, thereby opening switch S8 and releasing mirror lever 29 from being locked, so that mirror 46 rotates from its viewing position to its picture-taking position. Upon completion of the rotation of mirror lever 29, it releases cam 32 from its locked condition due to the rotation of forward curtain locking lever 31, whereupon forward curtain gear 34 rotates counterclockwise, whereby forward curtain 38 starts exposure. In synchronism therewith, pin 33a closes trigger switch S6, while the timing circuit anti-logarithmically converts the voltage of capacitor C1 to start charging capacitor C3. When the charging of capacitor C3 reaches a given level, electromagnet Mg2 is demagnetized to release rear curtain locking lever 39, so that rear curtain gear 41 rotates to control the completion of exposure by rear curtain 45.

For exposure control, with the shutter speed preselected, switch S9 is closed on contact b9 and switch S4 is closed on contact b4. Light measurement with a stopped-down diaphragm, in which only the film sensitivity is computed, is effected by the light measuring circuit. Diaphragm preset ring 24 is aligned with the minimum diaphragm stopped-down aperture (f:16 in the drawing), and shutter speed dial 48 is aligned with the desired selected shutter speed, so that the position of sliding terminal 12 of potentiometer R12 is determined and the output signal from the second signal generating circuit is input to the timing circuit.

In the diaphragm fully open condition as shown in FIG. 5, the output signal from the first signal generating circuit is provided to input terminal 8 of the differential amplifier, while the output signal from the second signal generating circuit at sliding terminal 12 is input to terminal 7 of the differential amplifier. In general, since the former input signal is greater than the latter input signal, power source switch S1 is closed due to the resultant releasing operation. In addition, if switch S7 is closed, then electromagnet Mg1 is excited and diaphragm locking lever 28 is attracted to electromagnt Mg1. As has been described, when sector shaped lever 20 is released by the releasing operation, diaphragm operating ring 25 is rotated clockwise by connecting pin 21 and interlocking ring 22 in association with the rotation of lever 20, whereby diaphragm blades 25b are stopped-down from their fully open condition. Then, the output signal from the first signal generating circuit which relates to light measurement with a stopped-down diaphragm is gradually lowered. Thus, when the output signal from the first signal generating circuit becomes equal to the output signal from the second signal generating circuit, the excitation of electromagnet Mg1 is interrupted, and diaphragm locking lever 28 is rotated clockwise accordingly. Then locking ratchet 25e engages ratchet teeth 20e to thereby lock sector shaped lever 20. Accordingly, diaphragm operating ring 25 is locked in position and then the diaphragm aperture is controlled. Subsequently, trigger switch S6 is closed and the timing circuit is operated at the selected shutter speed due to the output signal from the second signal generating circuit.

In the case of exposure control according to the programmed mode of operation previously described, switch S9 is closed on contact a9 and switch S4 is closed on contact b4. In this case, as well, sliding terminal 12 is set to a given position, by aligning diaphragm preset ring 24 with the minimum diaphragm aperture and shutter speed dial 48 with the graduation on the programming control. By depressing release button 17 to close power source switch S1, the output signal from the first signal generating circuit according to light measurement with a fully open diaphragm is provided to one of the input terminals of the differential amplifier, and the output signal at sliding terminal 12, to which is added the divided output signal at sliding terminal 13 of the aforesaid first signal generating circuit, is provided to the other input terminal 7, after which light measurement with a stopped-down diaphragm is commenced. Then, as has been described, when both input signals to the differential amplifier become equal, electromagnet Mg1 is demagnetized and diaphragm locking lever 28 locks sector shaped lever 20 in position to thereby control the diaphragm aperture.

Subsequently, trigger switch S6 is closed and the timing circuit will be operated due to the output signal from the second signal generating circuit, to which has been added the output signal obtained by dividing the output signal from the first signal generating circuit according to the light measurement with a stopped-down diaphragm with a controlled diaphragm aperture, whereby exposure control is effected commensurate to the brightness of an object in the mutually programmed relationship of the diaphragm aperture and shutter speed.

As many apparently widely different embodiments of the present invention may be made without departing from the spirit and scope thereof, it is to be understood that the invention is not limited to the specific embodiments thereof except as defined in the appended claims.

What is claimed is:

1. An exposure control device for a photographic camera having an objective lens and an adjustable diaphragm, comprising:
    a light measuring circuit for measuring the scene light transmitted through said objective lens and said diaphragm and for generating a measured light output commensurate with the brightness of said scene light;
    a first circuit for generating a first output signal to control shutter speed commensurate with said measured light output;
    means for manually selecting shutter speed;
    a second circuit for generating a second output signal commensurate with the shutter speed selected by said manual shutter speed selecting means;
    a timing circuit for controlling the shutter speed;
    means for selectively connecting said first and second output signals to said timing circuit;
    detecting means for detecting the difference between said first and second output signals; and
    means for controlling the diaphragm aperture in response to the difference detected by said detecting means.

2. An exposure control device as in claim 1, further comprising:
    means for triggering said timing circuit after operation of said means for controlling the diaphragm aperture in association with the release operation.

3. An exposure control device as in claim 1, wherein said means for manually selecting shutter speed includes an automatic exposure mode position, whereby selection of said automatic exposure mode causes said second output signal to be at a reference potential.

4. An exposure control device as in claim 1, further comprising:
    a diaphragm operating member for stopping-down the diaphragm from its fully open position;
    an arresting member for arresting said diaphragm operating member to maintain the diaphragm in the fully open position; and
    means for releasing said diaphragm operating member from arrest by said arresting member after said first and second circuits have operated in association with the release operation to generate said first and second output signals, respectively.

5. An exposure control device as in claim 4, wherein said first circuit includes means for storing said first output signal prior to the release of said diaphragm operating member from its arrested condition and the operation of said means for selectively connecting.

6. An exposure control device as in claim 4, further comprising:
    manual diaphragm aperture adjusting means for locking the diaphragm in a set position after said diaphragm operating member has been released from arrest by said arresting member.

7. An exposure control device as in claim 4, wherein said detecting means includes a meter for detecting the difference between said first and second output signals, said diaphragm aperture controlling means locks the diaphragm after the release of said arresting member from its arrested condition commensurate with the deflected angle of a pointer of said meter.

8. An exposure control device as in claim 4, wherein said detecting means includes a differential amplifier circuit, said first and second output signals are input to said differential amplifier circuit, and wherein with said differential amplifier circuit detecting that said first and second output signals are substantially equal, said diaphragm operating member is stopped by locking said diaphragm in position to thereby control the diaphragm aperture.

9. An exposure control device as in claim 6, further comprising means for storing said first output signal and wherein said manual diaphragm adjusting means is adjusted to a diaphragm aperture for photographing, said means for selectively connecting connects said means for storage to said timing circuit, said means for manually selecting the shutter speed is set to automatic exposure control, thereby controlling the shutter speed with the diaphragm aperture to be adjusted by means of said manual diaphragm adjusting means.

10. An exposure control device as in claim 6, wherein said means for manually selecting shutter speed selects a shutter speed for photographing, said manual diaphragm adjusting means is adjusted to the minimum diaphragm aperture, said means for selectively connecting connects said second signal circuit to said timing circuit, and said diaphragm aperture controlling means controls the diaphragm aperture for the selected shutter speed commensurate with the brightness of the scene light, and said timing circuit is operated at said selected shutter speed for exposure control.

11. An exposure control device as in claim 1, further comprising means for generating a constant voltage, a third circuit for generating a second output signal representative of the sum of said constant voltage and at least a portion of said first output signal, and switch means for alternatively connecting said second circuit or said third circuit to said detecting means, whereby when said third circuit is connected to said detecting means said means for controlling controls the diaphragm aperture in response to the difference between said first and third signals.

12. An exposure control device as in claim 11 further comprising a diaphragm operating member for stopping-down the diaphragm from its fully open position;
    an arresting member for arresting said diaphragm operating member to maintain the diaphragm in the fully open position;
    means for releasing said diaphragm operating member from said arresting member;
    means for storing said first output signal before the stopping-down of said diaphragm is commenced; and
    means for generating a voltage commensurate with a portion of the stored signal.

13. An exposure control device as in claim 12 further comprising a variable resistor common to said second and third circuits and including a tap at which said second and third output signals are generated, said switch means being disposed between said variable resistor and said means for generating a voltage commensurate with a portion of the stored signal, whereby said constant voltage can be varied by adjusting the variable resistor.

14. An exposure control device as in claim 13 wherein said detecting means includes a meter for detecting the difference between said first and second output signals, said diaphragm aperture controlling means locks the diaphragm after the release of said arresting member from its arrested condition commensurate with the deflected angle of a pointer of said meter.

15. An exposure control device as in claim 13, wherein said detecting means includes a differential amplifier circuit, said first and second output signals are input to said differential amplifier circuit, and wherein with said differential amplifier circuit detecting that said first and second signals are substantially equal, said diaphragm operating member is stopped by locking said diaphragm in position to thereby control the diaphragm aperture.

16. An exposure control device for a photographic camera having an objective lens and an adjustable diaphragm, comprising:
a light measuring circuit for measuring scene light transmitted through said objective lens and said diaphragm to generate a measured light output commensurate with the brightness of said scene light;
a first circuit for generating a first output signal commensurate with said measured light output;
a second circuit for generating a constant output signal;
means for storing said first output signal prior to the release of the diaphragm operating member from its arrested condition in response to releasing operation;
converting means for producing a second output signal by adding a portion of the signal in said storage means to said constant output signal;
means for detecting the difference between said first output signal and said second output signal;
a diaphragm aperture control member for controlling the diaphragm aperture by locking said diaphragm operating member according to the difference detected by said means for detecting;
a timing circuit for controlling the shutter speed;
means applying said second output signal to said timing circuit; and
means for triggering said timing circuit after said diaghragm aperture control member has controlled the diaphragm aperture.

17. An exposure control device as in claim 16, wherein said means for applying selectively connects said converting means and said means for storing to said timing circuit.

18. An exposure control device as in claim 16, wherein said converting means includes means for manually varying said portion of the signal stored in said means for storing.

19. An exposure control device as in claim 16, wherein said converting means includes means for converting said constant output signal.

20. An exposure control device as in claim 19, wherein said means for applying selectively connects said converting means, said means for converting said constant output signal, said means for storing and said second circuit to said timing circuit.

21. An exposure control device as in claim 16, wherein an exposure control is effected by a pre-programmed relationship between the diaphragm aperture and shutter speed by triggering said timing circuit after said means for detecting has controlled the diaphragm aperture by said diaphragm aperture control member with said means for applying connecting said converting means to said timing circuit.

* * * * *